United States Patent [19]
Bruno et al.

[11] Patent Number: 5,244,020
[45] Date of Patent: Sep. 14, 1993

[54] DISPENSER

[75] Inventors: Adrian A. Bruno, Morton Grove, Ill.; Richard Caron, Cambridge, Mass.; Gorm Bressner, Cambridge, Mass.; Kevin Barnes, Cambridge, Mass.; Philip Carbone, Cambridge, Mass.; Robert Simek, Cambridge, Mass.

[73] Assignee: Middleby Marshall Inc., Elgin, Ill.

[21] Appl. No.: 735,375

[22] Filed: Jul. 24, 1991

[51] Int. Cl.$^5$ .......................................... G01G 13/02
[52] U.S. Cl. ........................................ 141/83; 141/82; 141/71; 141/255; 141/256; 99/455; 99/466; 177/50; 177/120; 222/146.6; 222/165; 222/227; 222/228; 222/240; 222/413; 340/613; 340/648; 364/479; 364/508
[58] Field of Search ............. 141/83, 94, 71, 82, 141/255, 256, 259, 266, 128; 340/613, 648; 222/55, 56, 77, 63, 164, 227, 228, 231, 240, 241, 412, 413, 146.6, 165; 177/50, 120, 121; 364/479, 508, 567; 99/455, 460, 466; 220/457, 458; 312/270.1–270.3, 273, 274, 322, 323, 236

[56] References Cited

U.S. PATENT DOCUMENTS

| | | | |
|---|---|---|---|
| 321,078 | 6/1885 | Birckhead | 312/323 X |
| 776,736 | 12/1904 | Greenen | 312/323 |
| 2,373,838 | 4/1945 | Lindholm | 177/120 X |
| 2,682,161 | 6/1954 | Ihle et al. | 222/165 X |
| 2,794,577 | 6/1957 | Van Leeuwen | 222/227 |
| 3,537,618 | 11/1970 | Alvarez | 222/240 X |
| 3,640,088 | 2/1972 | Jacobus et al. | 62/320 |
| 3,696,581 | 10/1972 | Eisenberg | 141/78 X |
| 3,918,266 | 11/1975 | Gindy et al. | 141/83 X |
| 3,990,212 | 11/1976 | Flodin | 141/83 X |
| 4,189,063 | 2/1979 | Matthiesen | 222/77 X |
| 4,333,588 | 6/1982 | Schreck et al. | 222/164 |
| 4,451,823 | 5/1984 | Penn et al. | 340/648 |
| 4,467,844 | 8/1984 | Di Gianfilippo et al. | 141/83 X |
| 4,723,614 | 2/1988 | Lahti | 177/120 |
| 4,850,515 | 7/1989 | Cleland | 222/164 X |
| 4,949,879 | 8/1990 | Mariotti | 222/413 |
| 5,054,654 | 10/1991 | Schroeder et al. | 222/146.6 |

FOREIGN PATENT DOCUMENTS

| | | | |
|---|---|---|---|
| 1027443 | 4/1958 | Fed. Rep. of Germany | 222/240 |
| 0689456 | 3/1953 | United Kingdom | 222/240 |

Primary Examiner—Henry J. Recla
Assistant Examiner—Casey Jacyna
Attorney, Agent, or Firm—Laff, Whitesel, Conte & Saret

[57] ABSTRACT

A dispenser of foodstuff is particularly well adapted to deliver cheese for pizza making. A refrigerator contains a bin which may be completely removed from said refrigerator for cleaning, as in a dishwasher, for example. The bin features inwardly sloping walls so that the cheese does not normally stick to the wall. An auger delivers the cheese to a spout where a star wheel meters flow and breaks up any clumps in the cheese. A spring biased trap door closes the spout, especially when the bin is removed from the refrigerator. The refrigerator contains parts which control the opening and closing of the trap door and the turning of the auger. The entire system operates under the control of a programmable microprocessor which includes means for detecting when the bin is empty or is failing to delivery the cheese.

37 Claims, 5 Drawing Sheets

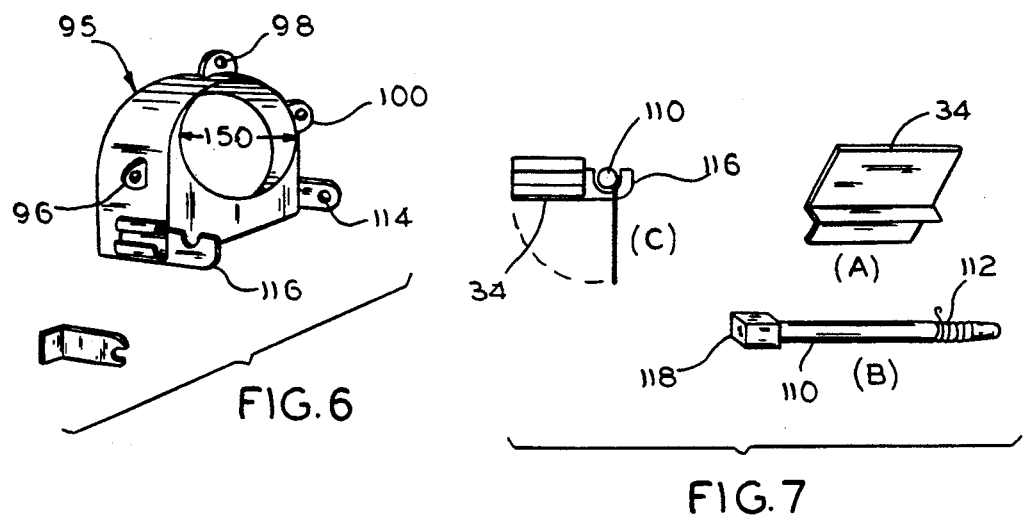
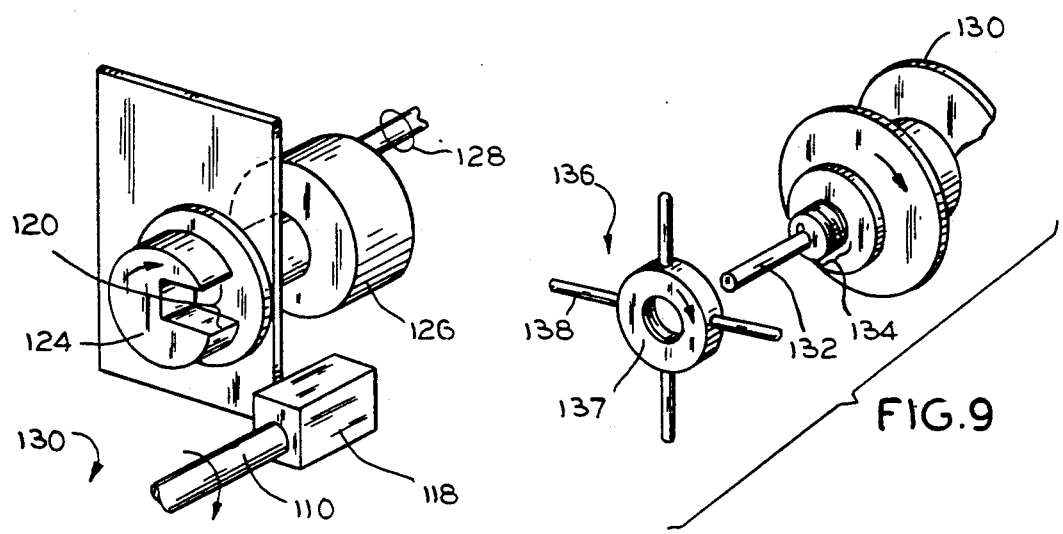
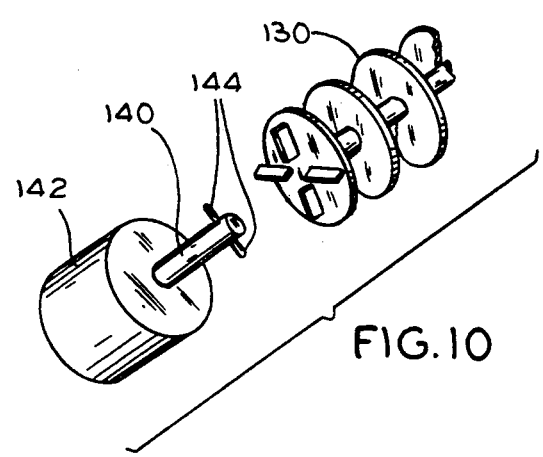

DISPENSER

This invention relates to dispensers and more particularly to dispensers for batches of products—such as sticky foodstuff—which tend to clump together.

For convenience of expression, the inventive dispenser will be described hereinafter as dispensing shredded cheese; however, it should be understood that the invention is not limited to this particular use. Quite the contrary, the inventive dispenser may be used to dispense any suitable product, all of which are intended to be covered by the use of the term "cheese". For example, the inventive dispenser may also dispense ground meat, cereals, nuts, seeds, chopped vegetables, candies, or other particulates which may tend not to flow smoothly. U.S. Pat. No. 4,723,614 granted to Arne Lahti shows one example of a dispenser which is similar to the inventive dispenser.

Certain products—especially foodstuffs—have to be repeatedly delivered in fixed and uniform batch sizes, but they have characteristics which heretofore has made it all but impossible for an automatic dispensing machine to have the smooth flow which makes such uniformity likely or even possible.

A pizza provides an example of such a product. Cheese is a primary and costly topping ingredient for pizza dough. The restauranteur prices a pizza on an assumption that it contains an exact amount of cheese. Since pizzas are made on almost a mass production basis, it would be desirable to simply push a button and deliver exactly the prescribed amount of cheese. However, shredded cheese is a sticky material which tends to clump and not to feed smoothly from an automated dispensing machine. Therefore, the amount of cheese in any given pizza is liable to vary greatly from the amount which the restauranteur considered when he priced the pizzas. Therefore, for these and other reasons it has been thought that it is impossible to deliver a fixed batch of cheese at the push of a button.

This raises three problems. The first is honesty in the measurement. The second is the customers good will, which may be lost when he realizes that his portion has been slighted as compared to the pizza which he sees at the next table. The third problem is that the restauranteur may suffer severe financial loss if the product which he serves is consistently more than he is paid to serve.

When attempts have been made to move a product, such as shredded cheese, from a bin to a delivery chute, there have been many practical problems entirely aside from the need to deliver uniform batch sizes. For example, the cheese may form a self supporting bridge across the bin, while a delivery means eats away the cheese which is under the bridge. Therefore, unless someone constantly monitors the bin to break these bridges, there may come a time when the delivery mechanism has exhausted all of the cheese product in the vicinity of the delivery mechanism and ceases to deliver anything, while the machine continues to operate as if it is delivering product. It is difficult to give an operator an accurate signal when such an exhaustion occurs.

Still another problem grows out of a need for sanitation. A product such as cheese forms a very fertile nutrient for bacteria and germs. Hence, it is the kind of product which has incited governmental, industrial, and other agencies to set rules, regulations, and standards which must be met by all machines. These standards may incorporate, prescribe, and regulate anything from the radius of corners to the temperature and humidity of product storage.

From still another viewpoint, the restauranteur must always be extremely vigilant, so that his patrons do not become sick after having eaten his product. Of course, there is the humanitarian motive of not injuring anyone. There is also the commercial viewpoint, that a even single episode of food poisoning could ruin one's business and reputation for the rest of his life.

In view of all of these and other considerations, it is most difficult to design a dispenser for a product such as cheese. Beyond the difficulty of design, there is the convenience or inconvenience for the user. For example, if it is necessary to keep the product in a refrigerator in order to preserve and protect it, it also becomes very expensive, time consuming, tiring, and cumbersome to have to continuously open and close the refrigerator door, lift out the container for the product, clean it off, and return it to the refrigerator. When the time comes to clean the dispensing machine, it is handy to simply put it in a dishwasher.

For these and other reasons, there is a need for a simple, easy to use, completely sanitary, and reliable dispenser for shredded cheese and similar products.

Accordingly, an object of the invention is to provide new and improved means for and methods of delivering precisely measured batches of product which are subject to clumping, bridging, or the like. Here an object is to provide a dispenser for shredded cheese or similar particulate material. In this connection, an object is to provide a dispenser which may be used in all restaurants in a fast food chain (e.g. pizza restaurants) in order to give nationwide uniformity of product (e.g. pizzas).

Another object is to maintain a closely regulated control over temperature and humidity of product in the above described machine.

Still another object is to maintain a sanitary environment which meets and exceeds all pertinent rules, regulations, and standards for the product.

Yet another object of the invention is to accomplish all of these and other objects by a dispenser which is easy to use, service, and maintain.

In keeping with an aspect of the invention, these and other objects are accomplished by providing a dispenser bin, which sets inside a refrigerator and delivers product through an output chute formed in the refrigerator. The bin is adapted to be pulled out and tipped to an ergonomic fill position in which shredded cheese, or a similar product, may be loaded. The delivery of product is monitored at all times, to insure delivery of a correct batch size and to detect bin empty or bridged conditions. The bin and all parts associated therewith may be put into a dishwasher for cleaning.

A preferred embodiment of the invention is shown in the attached drawings wherein:

FIG. 6 is a first perspective view of a spout assembly of the dispenser;

Figure 11:
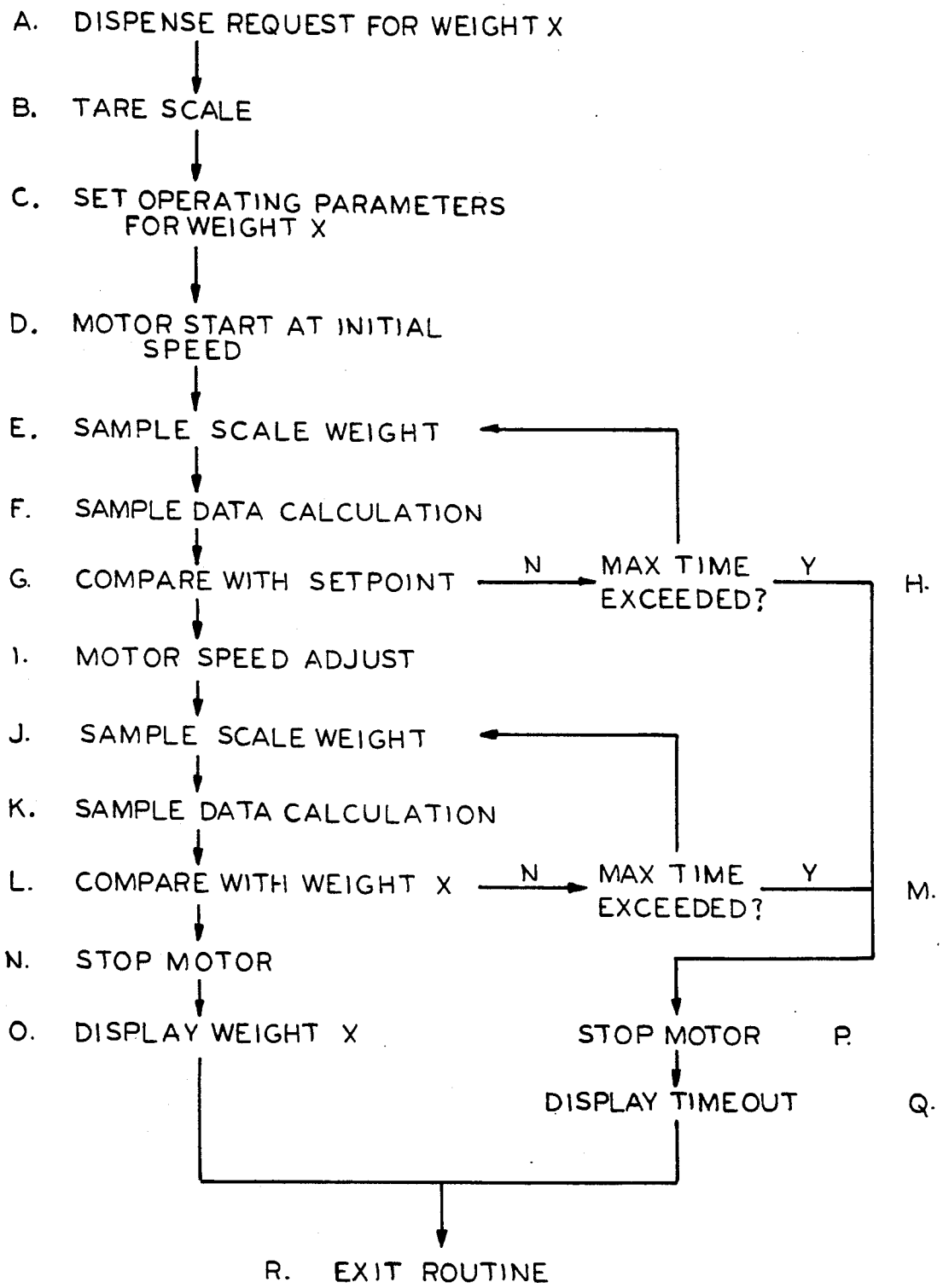

FIGS. 7A-C are three views showing a trap door and axle assembly for controlling an output from the spout;

FIG. 8 is a perspective view showing a trap door drive (opener/closer) coupler which is mounted in the refrigerator and connected to a microprocessor via a clutch mechanism;

FIG. 9 shows the front end of the product feed auger together with a star wheel valve for breaking up and portioning clumps of cheese as it is being delivered;

FIG. 10 shows the opposite end of the auger and a drive mechanism in the back of the refrigerator; and FIG. 11 is a flow chart for a microprocessor which controls the dispenser.

Figure 1:
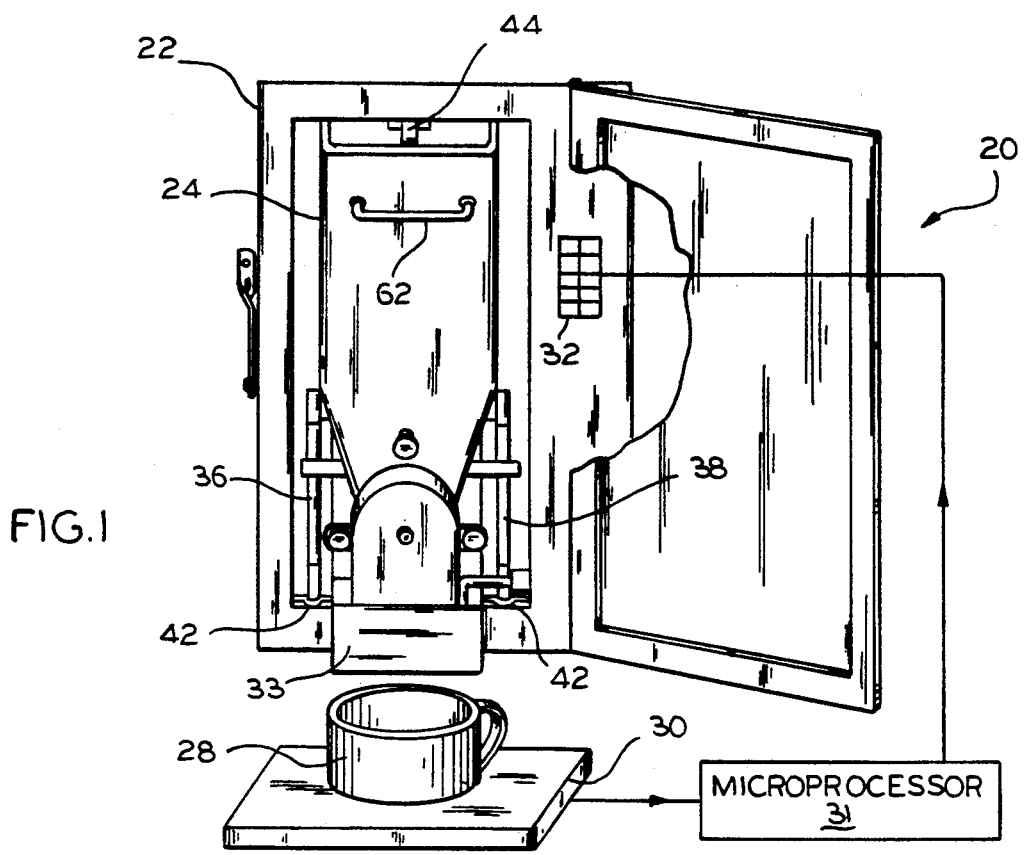
FIG. 1 is a perspective view of the inventive dispenser inside a refrigerator, in a product delivery position, and with the refrigerator door open.

FIG. 1 shows a dispenser 20 comprising a refrigerator 22 (here shown with the door open), a dispenser bin 24, a product delivery spout 26, a cup 28 for receiving product, a scale 30 for weighing the received product, and a control panel 32 of keys which are covered by a continuous plastic sheet. Among other things, control panel 32 programs a microprocessor 31 which controls the dispenser. The bin 24 holds the cheese which is dispensed through spout 26 even when the refrigerator door is closed. The spout 26 is surrounded by a plastic liner member 33 which may be removed for easy cleaning. The spout 26 is opened and closed by a spring biased trap door 34.

The bin 24 sits on a cradle in the form of two spaced parallel runners or bars 36, 38 which are attached to and move with the bin. Since the bin 24 simply sets on these bars, it may be lifted out of or set into the refrigerator 22 as a unit.

Figure 2:
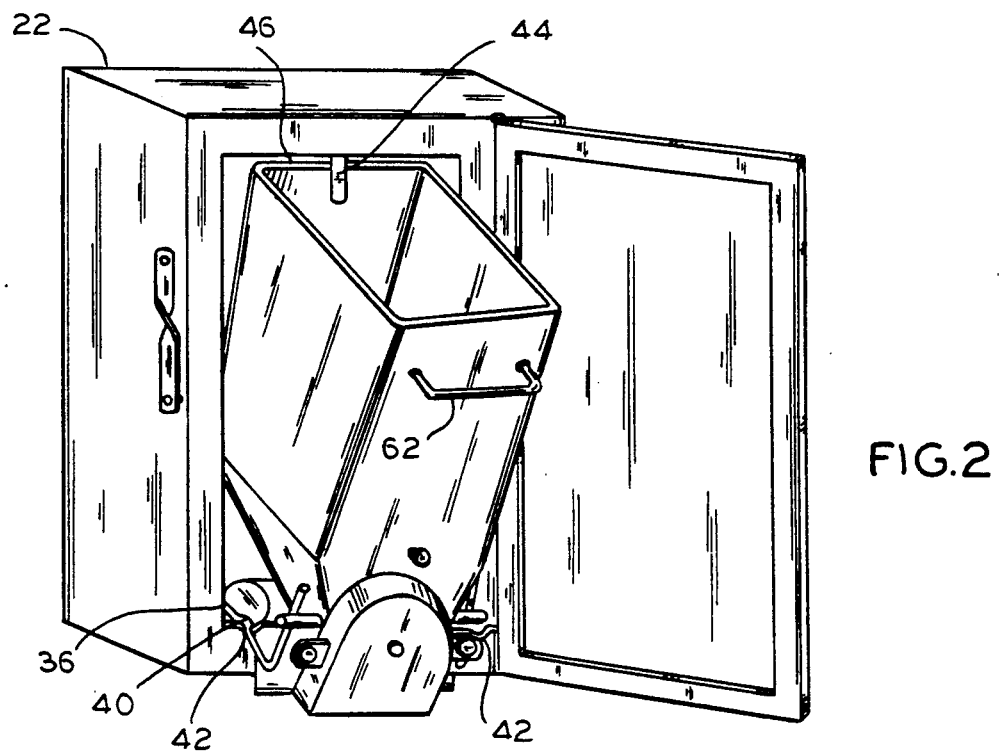
FIG. 2 is a view similar to that of FIG. 1 with the dispenser tipped into an ergonomic fill position.

Approximately midway along the length of each of the runners 36, 38, there is an upwardly directed indent, notch, or catch 40 (FIG. 2) which rests under gravity on and is held in place by a mating threshold or tilt-out guides 42 on the front of the refrigerator. A catch 44 on the top of the refrigerator is a hook which engages the upper edge 46 at the back of the bin 24. When so held in this position, the bin tips stably to and sets in a fill position where its open top is exposed so that cheese may be added to the bin.

In the tipped position, the bin 24 is simply resting under gravity; therefore, it may be removed by raising catch 44 and then lifting the bin out of the refrigerator. Or, by slightly lifting the front of the bin, the indents or notches 40 may be lifted off the threshold or tilt out guides 42. Then, the bin is simply pushed back into the refrigerator.

Figure 3:
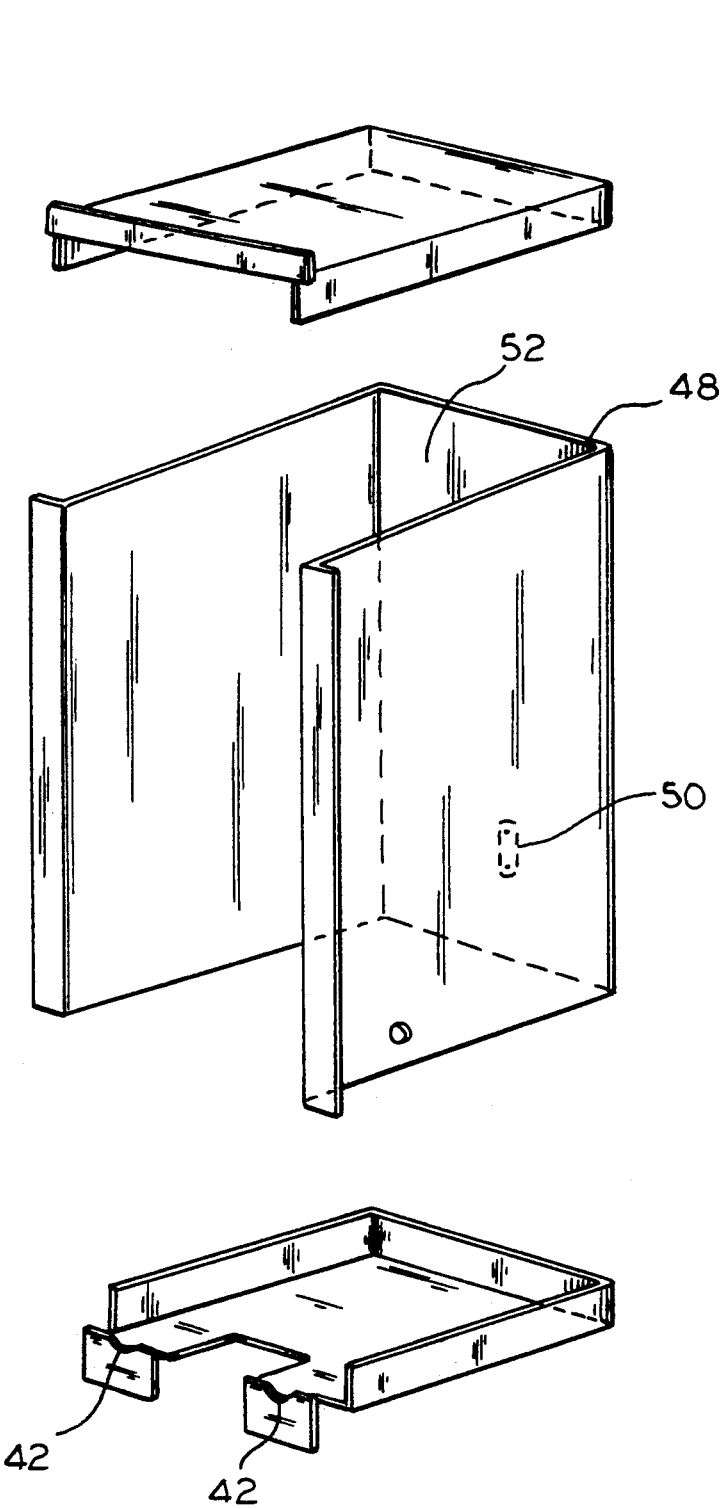
FIG. 3 is an exploded perspective view which shows an inner cavity wall for the refrigerator.

The inside walls of the refrigerator 22 are shown in FIG. 3. These walls are preferably made of stainless steel which are welded together so that they may be cleaned. Among their other features, the corners 48 of these walls are radiused for easy cleaning. An entrance 50 in the back wall provides access for applying a driving force for delivering the cheese to the spout 26. A motor behind the rear wall 52 applies this force to turn a horizontal auger inside the bin 24.

The housing of bin 24 (FIG. 4) is an open topped stainless steel box having upper side walls 54, 56 which slope inwardly by at an angle A so that the contents of the bin or cheese fall under gravity away from the walls and down into the bin. Thus, this inwardly sloping wall tends to eliminate bridging and to promote smooth feeding. In one embodiment the angle A was 4°. To further enhance this fall away capability, the interior walls of bin 24 may be coated with a non-stick plastic or similar material, such as "TEFLON", "SILVER STONE", or the like. The lower side walls 58, 60 form a trough or somewhat funnel like bottom contour for guiding and directing the cheese into an auger. All corners of the bin are rounded to meet the requirements for cleaning out the bin.

A handle 62 is welded to the top of the bin to facilitate a manipulation thereof. A reinforcing ring shaped flange 64 is welded over a hole 66 at the back of the bin. The back end of the auger passes through this hole and also forms a seal.

Four connectors (two of which are seen at 66, 68) provide means for attaching the runners 36, 38 to opposite sides of the bin, which form the bin cradles. That is, the upper ends 70, 72 of runner 38 fit through holes 74, 76 in connectors 66, 68. The bottoms of runners 36, 38 rest on the floor 77 (FIG. 3) of the refrigerator.

A pair of agitator arms 78 (FIG. 5) include a bearing 80 on one end and a threaded hole or receptacle 82 on the other end to receive a thumb screw 84 (FIG. 4) which passes through stud or threaded member 86. The agitator is installed in the bin by placing bearing end 82 into bearings (not shown in FIG. 4) on side 54 of the bin 24 and by aligning the threaded hole 82 with a stud 86 on the lower side wall 60. Then a thumb screw 84 is inserted through the stud 86 and turned into the threaded hole 82. This leaves the agitator 78 free to turn inside the bin 22. A second or third agitator is installed in the same manner.

Figures 5, 5A:
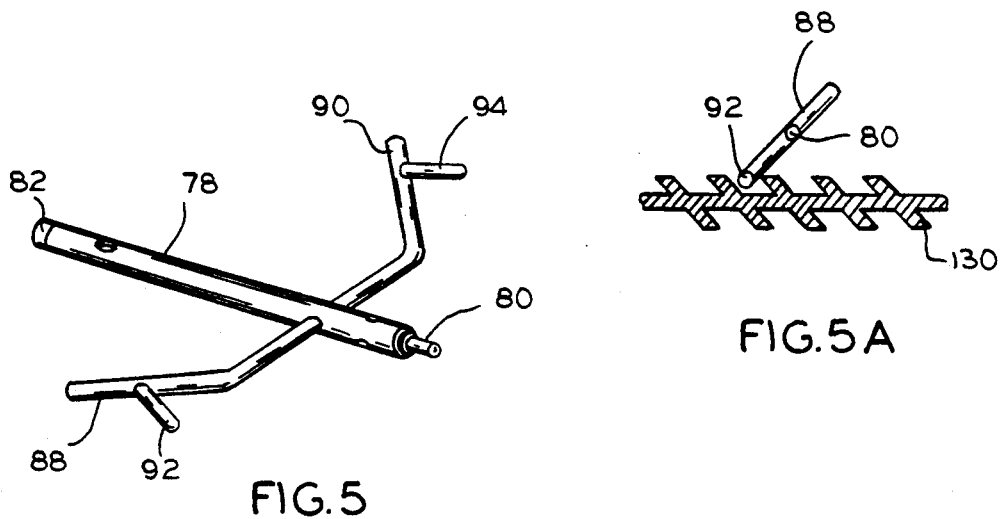
FIG. 5 is a perspective view of an agitator assembly.
FIG. 5A is a cross-section of an auger which shows a drive mechanism for the agitator of FIG. 5.

The agitator has two arms 88, 90, each with a tab 92, 94 thereon. As shown in FIG. 5A, the rotary mounted agitator 88 has a tab end 92 which fits into the flight on the auger 130. Therefore, as the auger 130 turns, it mechanically bears against and rotates the agitator 78. As the tab end 92 begins to emerge from the auger flight, a second tab end 94, on the other side of agitator 78 enters the flight so that the agitator continues to rotate as long as the auger rotates. This agitator rotation breaks any bridges of cheese which might otherwise form as the auger carries away the cheese under the bridge.

FIG. 6 shows the spout assembly 95 which is attached to the front of bin 24. Outstanding ears 96, 98, 100 fit over and are bolted to studs 102, 104, 106 (FIG. 4) on the bin 24. A trap door 34 (FIG. 7A) has an axle 110 (FIG. 7B) with a bias spring 112 which normally keeps the door closed, which is especially important when the bin 24 is removed from the refrigerator 22, for loading and handling. The axle end with bias spring 112 fits into a hole 114 of a support on the spout assembly 95. The opposite end of axle 110 lays in a recess 115 of holder or axle guide 116. After the axle is laid in a recess in guide 116, a slide member 117 is slipped into a guide formed by two folded over tabs 119. A cove 121 in slide 117 fits over and traps axle 110 in the recess 115. This way, the trap door may be removed for easy cleaning, without requiring special tools.

A square end 118 on the axle 110 provides a means for turning the axle in order to open or close the trap door 34 under control of a mechanism (FIG. 8) built into the refrigerator wall. When square end 118 is released as the bin is lifted out of the refrigerator, the spring 112 closes the trap door to prevent a scattering of cheese as the bin is carried away from the refrigerator.

Simply by placing the bin in the refrigerator, the square end 118 on the trap door axle 110 may be fitted into an opening 120 (FIG. 8) in a coupling nut 124 mounted on the refrigerator. Coupling nut 124 (FIG. 8)

is connected through a clutch 126 within the wall of the refrigerator (FIG. 1) to any suitable control means such as the keyboard panel 32. The clutch 126 is electrically controlled by signals transmitted thereto, via Wires 128. The square member 118 on the end of the trap door axle 110 fits into a complementary opening 120 in coupling nut 124. When the clutch 126 is engaged, the nut 124 turns the square end 118 to open the trap door. Thus, each measured batch of cheese is dumped into the cup 28 (FIG. 1) and weighed on scale 30.

Means are provided for breaking up and separating any clumps of the cheese which the auger delivers to the spout. This is important so that the scale 30 (FIG. 1) will not give a false reading owing to the impact of a heavy falling clump. More particularly, FIG. 9 shows the front end of an auger 130 for delivering cheese to the spout. The auger shaft 132 terminates in threads 134 onto which a star wheel 136 may be turned. The threads 134 turn in a direction which tends to tighten the star wheel 136 as the auger 130 turns. The front end of the auger is supported by and the star wheel is enclosed within the spout assembly 95.

The star wheel 136 may be described as a hub-like nut 137 which has a suitable number (4 to 16) of spokes 138, possibly of various configurations, welded thereto and radiating therefrom. These spokes may have a variety of forms depending upon the product being delivered by the dispenser. For example, the may be curved, paddles, or the like. As the auger 130 turns, the spokes tend to break up any clumps of cheese which might otherwise form in the spout assembly. The spokes, thus, promote a uniformity of the metering of the product.

FIG. 10 shows the back end of the auger 130. In the area 50 (FIG. 3), at the back of the refrigerator, there is a shaft 140 which is turned by a motor 142 that is in the refrigerator and behind the interior wall 52. The end of auger shaft 132 terminates in one or more outstanding fins 143. The end of a motor shaft 146 terminates in a transverse key member 144 which is complementary to engage and turn the auger by bearing against the fins 143. Therefore, when the bin is placed inside the refrigerator, key member 144 engages the fins 143. The motor 142 turns the auger 130 and, in turn, it turns the agitators (FIGS. 5 and 5A). To install the auger, the end 143 is inserted through opening 150 (FIG. 6) in spout 95, front opening 152 (FIG. 4) in bin 24, back opening 66 at the rear of the bin, and onto the shaft 146 (FIG. 10).

When the microprocessor 31 (FIG. 1) detects a demand for the delivery of product, it sends a signal over line 150 which starts the motor 142 (FIG. 10). Auger 130 turns while the microprocessor counts down predetermined time periods, such as five and ten seconds. When scale 130 detects a delivery of a full batch size (i.e. the product in cup 28 weighs a pound, for example), a signal is returned on wire 152 to the microprocessor 31.

In the above example of five and ten seconds, an assumption might be that it is physically impossible for the dispenser to deliver a full batch in less than five seconds and that the system is not operating properly if it takes more than ten seconds to deliver a full batch. Therefore, if the scale 30 returns a signal over wire 152 in, say three seconds, it almost certainly means that a heavy clump of cheese was dropped into cup 28. The inertia of that falling clump caused the scale to bounce and give a false end of batch reading. Depending upon system needs, the microprocessor 31 may be programmed to simply ignore the end of the batch reading which appears too soon. Or, the microprocessor 31 may be programmed to stop the dispenser and give an alarm signal.

If a signal is not returned over wire 152 before time out (ten seconds in the above example), the microprocessor shuts down the system and returns a bin empty or other suitable error signal. An operator then pulls the bin out to a fill position (FIG. 2) and proceeds to either break the cheese bridge, fill the bin, or take some other action as may be required.

Another approach is to put a torque sensor on the motor 142 (FIG. 10). If the auger is properly delivering cheese at a prescribed rate, the sensor will detect a predetermined torque. On the other hand, if the auger jams, the sensed torque goes over a certain limit. Or if the bin is empty or bridged, the sensed torque does not raise to a predetermined level. Either way suitable signals may be given to indicate that service or maintenance is required.

FIG. 11 is the flow diagram for the operation of microprocessor 31 (FIG. 1).

At Step A, an operator keys in a request for a specific amount of the product which is delivered by the dispenser. This may be done in any convenient way. For example, the program might be arranged so that an operator keys 1, 2, . . . etc. for specific batch sizes or keys "16" for sixteen ounces. In any event, after the weight is selected, the operator pushes a "start" or "go" button and the microprocessor advances to the next step.

The microprocessor advances to Step B, where it contacts and initializes the scale 30. Basically, this means that the scale is set to zero with an empty cup 28 resting on it. Thus, it is irrelevant whether different weight cups are used. This initialization of the scales occurs automatically prior to each dispensing of product.

Then, at Step C, the microprocessor sets the scale according to the weight that was selected by the operator. Thus, for example, if the operator keyed a "1" perhaps the end weight for the scale might be set at 16 ounces.

At Step D, the microprocessor starts motor 142 (FIG. 10) at an initially high speed for fast delivery of product. Again, the operator may key in a starting speed which is appropriate for the material being delivered.

At Step E, the microprocessor samples the weight being read by the scale 30 to be certain that the product is feeding at an anticipated rate. At Step F, the data received from the scale is compared with set point data (i.e. sixteen ounces in the above example) which was keyed in by the operator. In effect at Step F, the microprocessor repeatedly calculates and recalculates the weight of the product that is being delivered to determine whether the answer is that which was set at Step C.

At Step H the microprocessor keeps asking itself if it has timed out. If not, a new calculation is made with current scale readings. If the microprocessor has timed out, it sends a signal to stop motor 142 at Step P and to display a suitable error signal at Step Q.

When the weight of the product reaches a predetermined level (Step I), the microprocessor adjusts the speed of motor 142 to deliver product as a slower rate. For example, when the motor is running at full speed, there may be at all times, say, three ounces of product falling through the air. This falling product is already committed to delivery, but does not yet appear in the scale output. Hence, the system slows the motor to reduce the amount of falling product to, say, one ounce. The operator may key in both the reduced motor speed and the weight of the delivered product which causes the switch to the reduced speed.

The operation at Steps J–M are the same as the operation at Steps E–H, except that the delivery has reduced to a slow motion or an inching speed.

When the scale records a weight (Step L) which corresponds to the weight set in Step C, the motor is stopped (Step N). Then, the weight of the delivered product is displayed (Step O) so that the operation may confirm that the requested amount has, in fact, been delivered.

Regardless of whether the full batch has been delivered at Step O or the dispenser timed out without delivering a full batch at Step Q, the microprocessor enters an exit routine at Step R, which returns it to Step A.

Figure 4:
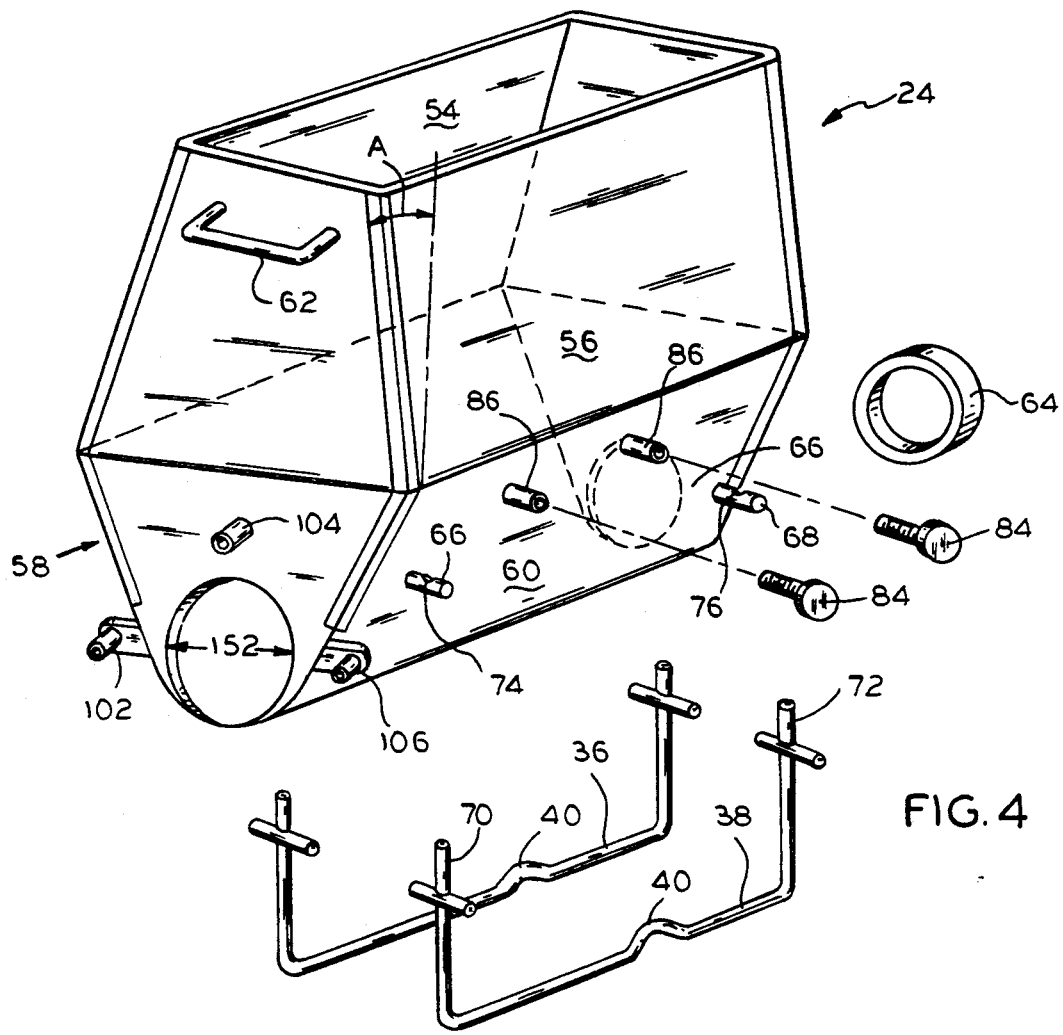
FIG. 4 is an exploded perspective view of the inventive dispenser bin.

It should now be clear that the bin 24 shown in FIG. 4 has inwardly sloping walls 54, 56 so that the food product falls in towards the center of the bin as it is being fed by the auger 130 and agitator 78 system. All of the inside corners of the bin are radiused to meet appropriate cleaning requirements set by the National Sanitation Foundation and, perhaps, other organizations.

The bin 24 is supported by a cradle 36, 38 which has tilt-out indents 40, 40 that meet and rest on the tilt-out guides 42, 42 at the front of the inner cavity floor of the refrigerator as shown in FIG. 3. This feature allows the bin to be pulled forward and tilted down, so that the user can fill the bin with food, without having to lift the entire bin assembly out of the refrigerated storage cavity. The bin is equipped with two agitators 78 which are driven by the auger, to flake up the sticky foodstuff and to feed it into the auger. The agitators are removable by unscrewing the agitator thumb screws 84, 84 shown in FIG. 4 and lifting the agitator assembly from the bin. The front of the bin is equipped with a spout assembly 95 as shown in FIG. 6 to guide the foodstuff through a 90° angle and to deposit it into the food cup.

The spout 95 has a trap door 34 which is hinged to the spout 95 in such a way that no crevice is exposed in which food may collect. The function of the door 34 is to ensure that foodstuff flow is positively stopped at the end of the dispensing of a batch. Also the closing of the door prevents a hot area which might cause food spoilage due to a temperature rise.

The door 34 is removable without requiring hand tools. The act of placing the door 34 on the door axle guide 116 causes the spring 112 to preload and to keep the door closed, which is especially important when the bin is decoupled and removed from the inner cavity of the refrigerator. The door is coupled to a door drive control (FIG. 8) when the bin is slid into the refrigerated cavity.

The trap door is driven by a motor and clutch assembly mechanism so that the door opening and closing is safe to the user. The door mechanism does not require positive positioning control, since the door hits a stop in both the open and close positions, thus causing the clutch to slip until the drive motor times out.

The auger system 130 has a characteristic mass throughput per revolution, depending on the product being dispensed. A microprocessor based control system senses when the mass throughput per revolution drops below a critical level causing the batch dispensing times to increase. This sensing gives a signal to tell the user that either the food inventory in the bin is at a low level or the foodstuff has bridged or otherwise ceased to flow out of the dispenser.

Those who are skilled in the art will readily perceive how to modify the invention. Therefore, the appended claims are to be construed to cover all equivalent structures which fall within the true scope and spirit of the invention.

The invention claimed is:

1. A dispenser system comprising a bin for holding a product which is to be dispensed in batch units, said bin having a spout means for delivering said product in said bin to said spout, said bin having a bottom wall with contours which directs said product into said delivery means, said contoured bottom wall having an upper portion and at least two walls which project upwardly from said upper portion and slope inwardly at an angle to extend at least partially over said bottom wall so that product will fall under gravity off said at least two walls and into said bin and means at the spout for metering product flow and for causing said product to issue as divided matter which does not stick together upon its delivery from said spout.

2. The dispenser system of claim 1 wherein said bin has walls which meet at corners which are radiused to provide for an easy clean-out.

3. The dispenser system of claim 1 and a refrigerator for containing and cooling said bin, support means on said bin for holding said bin in a stable and upright position resting on a floor of said refrigerator, means on said support means for holding said bin in a tipped position at a front of said refrigerator which exposes an opening for filling said bin, and means associated with said refrigerator for retaining said bin in said tipped position, whereby product may be loaded into said bin.

4. The dispenser system of claim 3 wherein said support means comprises a pair of spaced parallel runners with an indent near a middle thereof, and said front edge of said refrigerator having two tilt-out guides for said indents to rest on when said bin is in said tipped position.

5. The dispenser system of claim 1 wherein said means for delivering product comprises an auger extending horizontally through the bottom contours of said bin, and a motor for turning said auger, said auger feeding product into said spout when it is turned by said motor.

6. The dispenser system of claim 5 and said means at said spout for issuing divided matter comprises a star wheel attached to the front of and turning with said auger for metering flow and for breaking up product issuing from said auger.

7. The dispenser system of claim 6 wherein said star wheel comprises a central hub-like member with a plurality of spokes radiating therefrom.

8. The dispenser of claim 5 further comprising means for weighing, and means at said spout for providing a smooth flow of particulate matter from said dispenser to said means for weighing.

9. The dispenser system of claim 1 and a spring biased trap door on said spout for normally closing said spout under the urging of said spring, and means for opening said trap door against the bias of said spring responsive to a command for delivery of product from said spout.

10. The dispenser system of claim 9 and a refrigerator for containing and cooling said bin, said refrigerator having an opening through which product issuing from said spout may pass, and said means for opening and closing said trap door being mounted on said refrigerator for engaging said trap door when said bin is in place within said refrigerator.

11. The dispenser system of claim 10 wherein said delivery means comprises an auger in said bin, and means in said refrigerator for turning said auger when said bin is in place within said refrigerator.

12. The dispenser system of claim 11 and agitator means in said bin, said agitator engaging a flight on said auger and being driven by a turning of said auger.

13. The system of claim 1 wherein said bin is removable and is mounted in a refrigerator and further comprising a means for weighing wherein said means for delivering also delivers product to said means for weighing and a means for feeding back signals from said means for weighing to stop said means for delivering responsive to a delivery of a predetermined amount of product to said means for weighing, a programmable microprocessor, and means responsive to a programming of said microprocessor for controlling said system in order to deliver a predetermined amount of said product.

14. The system of claim 13 further comprising means for programming said microprocessor to enable it to select a speed for said means for moving said product.

15. The system of claim 14 wherein said microprocessor selected speed is an initially high speed followed by a slow speed responsive to said feedback signal indicating an approach a complete delivery of said predetermined amount.

16. The system of one of the claims 13, 14, or 15 and means for programming said microprocessor to select said predetermined amount of product, whereby said means for weighing may delivery any selected one of many possible batch sizes.

17. The system of anyone of the claims 13, 14, or 15 and means for programming said microprocessor to give an alarm if said delivery of said predetermined amount is not completed within a predetermined period of time.

18. A system for delivering measured batches of foodstuff particles, said system comprising a housing having a dispensing opening therein, a removable bin for receiving, containing and supporting said foodstuff particles fitting into and enclosed by said housing, said bin having at least one bottom wall having an upper portion and at least some sloping walls which project upwardly from said upper portion and slope inwardly at an angle to extend at least partially over said at least one bottom wall said angle exceeding an angle of friction between said foodstuff particles and said sloping walls whereby particles fall under gravity from said bin and into said bin, a spout on said bin for delivering said food particles through said dispensing opening in said housing, receiving means positioned under said dispensing opening to receive said delivered food particles, and means for adjustably measuring a selected amount of said food particles received by said receiving means for insuring an accuracy of said batch size.

19. The system of claim 18 further comprising microprocessor means for controlling said system, and means for sending signals from said measuring means to said microprocessor for feeding back a signal for insuring accuracy of the amount of said food particles delivered to said receiving means.

20. The system of claim 18 wherein said foodstuff particles are shredded cheese and said the inward slope of said walls is at least 4° off perpendicular.

21. The system of claim 18 and clump separating means associated with said spout for insuring a separation of said particles into non-clumped fragments before they are deposited in said receiving means.

22. The system of claim 21 and an auger for delivering said foodstuff to said spout, said clump separating means comprising a star wheel on an end of and turning with said auger for breaking up clumps of said foodstuff particles within said spout.

23. The system of claim 22 wherein said star wheel comprises a hub having a plurality of spokes radiating therefrom.

24. The system of claim 22 wherein said bin is a separate unit which may be removed from and inserted into said housing, and means in said housing for receiving and turning said auger and clump separating means when said bin is inserted into said housing.

25. The system of claim 18 wherein said housing and bin comprises means for enabling said bin to set stably in either an operate position or a fill position.

26. The system of claim 18 wherein said bin and all parts associated therewith are removable in their entirety so that they may be removed from said housing and placed in a dishwasher.

27. The system of claim 18 wherein said housing is a refrigerator and said bin is a separate unit which may be removed as a unit from said refrigerator, means for automatically closing said spout when said unit is removed from said refrigerator, and means in said refrigerator for automatically opening and closing said spout closing means in response to a delivery of a measured batch of said foodstuff.

28. The system of claim 18 wherein said receiving means comprises a cup for emplacement under said spout and said measuring means comprises a scale for weighing said foodstuff in said cup.

29. The system of claim 18 and an auger for delivering said food particles to said spout, a star wheel comprising a hub having a plurality of spokes radiating therefrom, and means for supporting said star wheel near said spout for metering a flow of said food particles through said spout by stopping said flow of said particles when said auger stops.

30. A system for repeatedly delivering uniform batches of cheese, said system comprising a bin having a product feeding and directing lower wall with an upper portion and at least some upper walls which slope inwardly from said upper portion to extend at least partially over said lower wall, said inward slope being adequate to normally prevent said cheese from unduly sticking thereto, an auger extending through an area within said product feeding and directing lower wall, a star wheel on one end of said auger and a drive transmission device on an opposite end of said auger, a spout enclosing said star wheel, means for normally closing said spout to keep cheese interface cold and also to prevent said cheese from falling therefrom, a refrigerator for receiving and enclosing said bin, a product delivery opening in said refrigerator and adjacent said spout for enabling said cheese to leave said refrigerator when said spout closing means is open, means in said refrigerator for opening and closing said spout closing means as said batches of cheese are delivered, means in said refrigerator for receiving and turning said drive transmission device, and means between said refrigerator and said bin for exposing an opening in said bin for filling.

31. The device of one of the claims 1, 18, or 30 wherein at least an interior surface of said inwardly sloping wall is coated with a non-stick material.

32. The device of claim 31 wherein said non-stick material is a plastic material.

33. The system of one of the claims 1, 18, or 30 and means for detecting a valid and normal delivery of a batch of said product by said system, and means responsive to said detecting means for giving an alarm if aid delivery of product requires more than a predetermined period of time.

34. The system of claim 33 wherein said product delivery detecting means comprises a timer for measuring a time window during which a batch of said product must be delivered, and means for signaling an abnormal delivery if said batch is not delivered within said time window.

35. The system of claim 33 and means responsive to said detecting means for ignoring an end of batch signal if said signal appears so quickly that it would have been physically impossible to deliver a full batch of product before said end of batch signal appears.

36. The system of claim 33 wherein said detecting means comprises a scale for weighing product and a timer for determining how quickly said scale weighs a full batch.

37. The system of claim 33 wherein said detecting means comprises a torque detector for detecting whether a motor for delivery product has a predetermined torque loading.

* * * * *